United States Patent
Theis

(10) Patent No.: US 8,092,288 B2
(45) Date of Patent: Jan. 10, 2012

(54) MANAGING MULTI-PLAYER VIDEO GAME INPUT

(75) Inventor: Richard M. Theis, Sauk Rapids, MN (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 12/262,388

(22) Filed: Oct. 31, 2008

(65) Prior Publication Data

US 2010/0113116 A1  May 6, 2010

(51) Int. Cl.
*G06F 17/00* (2006.01)
(52) U.S. Cl. .......................................................... 463/7
(58) Field of Classification Search .................. 463/7–9, 463/40–42
See application file for complete search history.

(56) References Cited

U.S. PATENT DOCUMENTS

| | | | |
|---|---|---|---|
| 5,324,035 A * | 6/1994 | Morris et al. ................... | 463/42 |
| 6,482,087 B1 | 11/2002 | Egozy et al. | |
| 6,746,332 B1 * | 6/2004 | Ing et al. .......................... | 463/42 |
| 6,767,287 B1 * | 7/2004 | Mcquaid et al. ................ | 463/42 |
| 7,391,409 B2 | 6/2008 | Zalewski et al. | |
| 2001/0044338 A1 * | 11/2001 | Cheng .............................. | 463/36 |
| 2008/0261693 A1 | 10/2008 | Zalewski | |

\* cited by examiner

*Primary Examiner* — Ronald Laneau
(74) *Attorney, Agent, or Firm* — Cantor Colburn LLP

(57) ABSTRACT

A method of managing multi-player game input as single-player game input includes building a command queue, the command queue being a series of time-slices; extracting a most recent time-slice from the command queue, the most recent time-slice including at least one command from difference inputs of the multi-player input; building alternate command queues with information extracted from the most recent time-slice; analyzing the command queue and the alternate command queues to determine an optimum command queue, the optimum command queue including commands from at least one input of the multi-player input; and outputting the optimum command queue as the single-player game input.

4 Claims, 3 Drawing Sheets

MANAGING MULTI-PLAYER VIDEO GAME INPUT

BACKGROUND

1. Technical Field

This invention generally relates to video game user input. More particularly, this invention relates to managing multi-player video game input in a single-player gaming scenario.

2. Description of Background

Generally, video games may require a certain amount of technical expertise or "gaming ability." Occasionally, if a novice user wishes to advance in a video game beyond a personal plateau, it may be beneficial to receive lessons or input from a more experienced player. However, it may be difficult to accomplish more advanced gaming strategy or overcome difficult obstacles by simply receiving auditory instructions.

BRIEF SUMMARY

A method of managing multi-player game input as single-player game input is provided herein. The method includes building a command queue, the command queue being a series of time-slices and each time-slice of the series of time-slices including a sequence of commands received from the multi-player game input. The method further includes extracting a most recent time-slice from the command queue, the most recent time-slice including at least one command from a first input of the multi-player game input and at least one command from a second input of the multi-player input. The method further includes building alternate command queues with information extracted from the most recent time-slice, each alternate command queue including different input arrangements of the first input and the second input. The method further includes analyzing the command queue and the alternate command queues to determine an optimum command queue, the optimum command queue including commands from at least one input of the multi-player input, and the optimum command queue providing a sequence of commands as the single-player input. The method further includes outputting the optimum command queue as the single-player game input.

Additional features and advantages are realized through the techniques of the exemplary embodiments described herein. Other embodiments and aspects of the invention are described in detail herein and are considered a part of the claimed invention. For a better understanding of the invention with advantages and features, refer to the detailed description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains an exemplary embodiment, together with advantages and features, by way of example with reference to the drawings.

DETAILED DESCRIPTION

According to an exemplary embodiment, a system and methodology are provided which significantly decrease the complexity of receiving instruction within a video game. This decrease in complexity allows more interactive instruction, which may therefore increase the ability for a novice gamer to increase his/her skill in gaming.

According to an example embodiment, a novice gamer may receive instruction for a video game through direct input or control of a gaming sprite from another user. The input may be facilitated through an alternate command interpretation scheme which may manage input from more than one source. The alternate command scheme may allow control of a single player video game through multiple gamers, thereby facilitating progression through more difficult obstacles without completely extinguishing control from the novice gamer.

Figure 1:
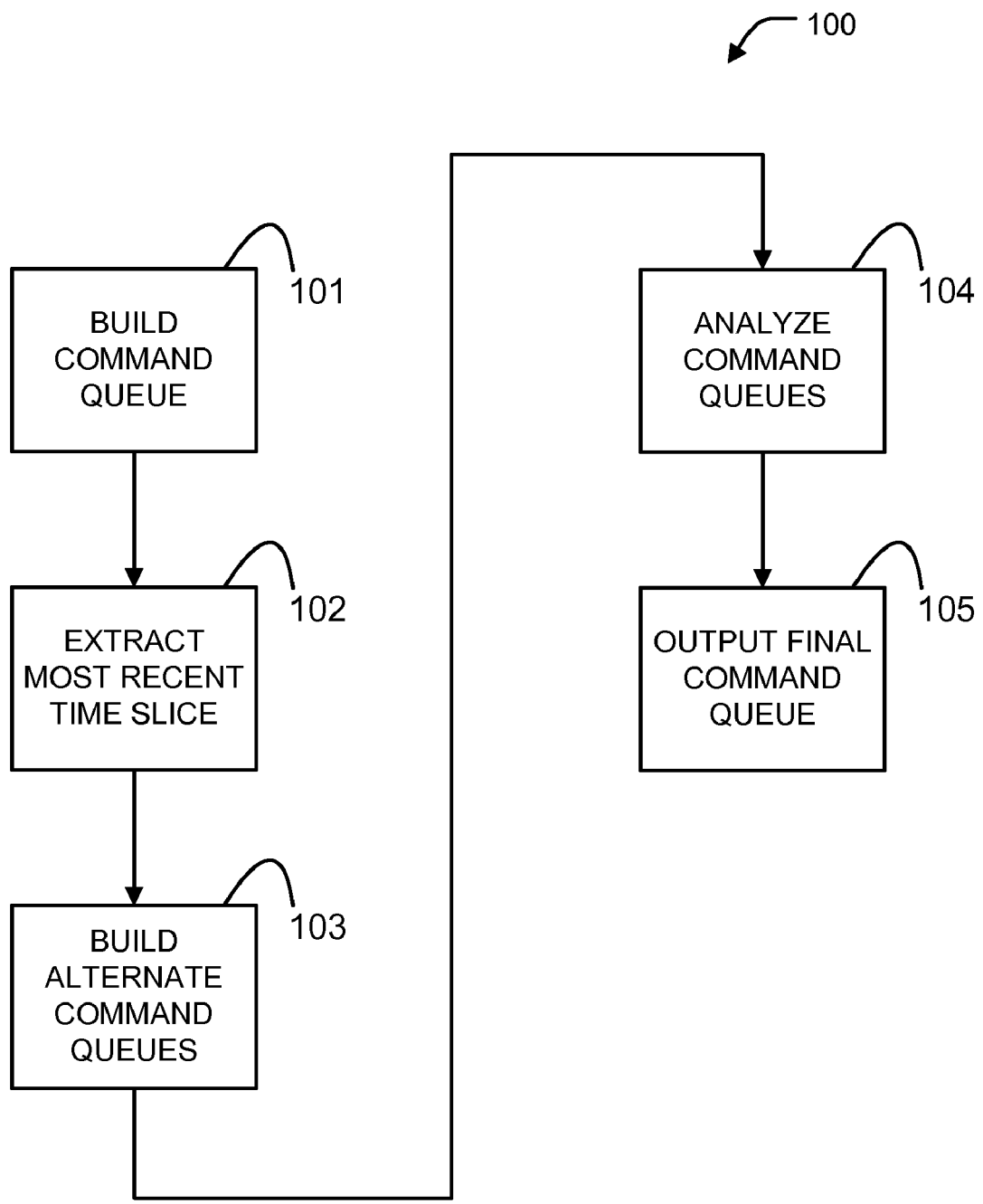
FIG. 1 illustrates a method of managing multi-player game input, according to an example embodiment.

FIG. 1 illustrates a method of managing multi-player video game input, according to an example embodiment. The method 100 includes building a command queue at block 101. For example, two or more gaming input apparatuses may transmit information regarding control of a video game. An input time slice command queue may be built based on the multi-player input. For example, two players, John and Steve, may produce control inputs for a video game. Table 1 below illustrates an example command queue.

TABLE 1

| | | Command | | | | |
|---|---|---|---|---|---|---|
| | ... | A | X | Up | Down | L2 | L1 |
| Player | ... | John | John | Steve | John | John | Steve |

The method 100 further includes extracting a most recent time slice at block 102. For example, the most recent time slice of commands from the base command queue (e.g., see Table 1) may be extracted. The time slice extracted may indicate which commands will be considered for manipulation. Commands not yet chosen from the base command queue are handled on subsequent extraction passes. For example, Table 2 below depicts a time slice extracted from the base command queue of Table 1.

TABLE 2

| Up | Down | L2 | L1 |
|---|---|---|---|
| Steve | John | John | Steve |

The method 100 further includes building alternate command queues at block 103. For example, several combinations of alternate command queues based on the original command queue in may be built. The combinations built may be an exhaustive set such as when only one command has been entered by each of the two players or may be a subset. If a subset must be chosen, the original command queue will be included in the subset. In addition, other combinations may be chosen in accordance with the player's game settings. That is, example embodiments may look for command patterns in the original command queue to build the alternate command queues. For example, related commands may be grouped together to enable a new combination move. Table 3 below illustrates example alternate command queues.

TABLE 3

| Up | Down | L2 | L1 |
|---|---|---|---|
| Steve | John | John | Steve |
| Up | | L1 | L2 |
| Steve | | Steve | John |
| Down | | L1 | L2 |
| John | | Steve | John |

The method 100 further includes analyzing alternate command queues at block 104. Each alternate command queue is analyzed and/or simulated to determine possible results. The analysis and/or simulation results are then added to the alternate command queues.

Finally, the 'appropriate' alternate command queue is chosen and sent for execution by the game (see block 105). The appropriate command queue is described in detail with regards to differing levels of assistance below. Note that this command queue may or may not be the same as the original command queue, but a subset or reorganization based on player input (command inputs may be sent at substantially the same time and master inputs may override slave inputs, etc.).

In at least one example embodiment, the methodology of FIG. 1 is executed in accordance with an "assistance mode" of multi-player control. This feature may be considered an assisted learning mode and is useful in helping novice players learn new games with the assistance of an experience player.

The assistance mode requires at least two players with separate input devices to control a single video game character/item/sprite/etc. The assistance mode provides a dial or input field for controlling the level of assistance (e.g., range of override <—> ignore). As such, one of the input devices is considered the master input device and the other(s) is/are the slave(s). For example, if Steve is teaching John to play a new video game, Steve's controller would be the master and John's would be the slave.

Initially, the players choose the initial level of assistance (e.g., override) and the master and slave controllers. From this initial setting, the level of assistance will dynamically adjust based on the performance of the slave controller. That is, as the player using the slave controller improves his/her skill, the level of assistance provided by the player using the master controller is dialed down. The opposite is done if the skill decreases. The skill of the player using the slave controller is determined based on the assistance provided by the player using the master controller. If the master consistently provides what the game determines as valuable assistance then the slave's skill is lowered. However, if the master consistently provides unnecessary or bad assistance then the slave's skill is increased. Additionally, if the master no longer needs to provide assistance at common locations in the past (e.g., large obstacles of the video game), the slave's skill may also be increased.

The following details how specific controls may be adjusted using the assistance mode feature and levels of assistance.

According to at least one example embodiment, directional controls may be adjusted according to at least three levels of multiplayer input management. These at least three levels may be integrated into the method 100 at blocks 103-105 to provide final command queue information. At the first level, an override level, the master's input overrides the slave input completely in a single time slice. For example: The slave wants to go forward (i.e. up button) but the master realizes that's a bad idea and stops the slave and moves him back (i.e. down button).

At the second level of the at least three levels, a mid-override level, the master's input and the slave's input are combined if both inputs come within the same time slice. For example: assuming the same situation above, the slave is slowed down instead of moved back. Basically, the directional controls are combined to produce a new direction. This allows the master to guide the slave slightly left, right, forward or backward as needed. The level of guidance is determined by the slave's skill. This is especially valuable as it is often difficult for novice players to navigate a 3D world.

At the third level, an ignore override level, inputs from the master are basically ignored. This may be considered an opposite of the override or first level described above.

According to at least one example embodiment, fast button controls/input are adjusted according to the at least three levels described above. These at least three levels may be integrated into the method 100 at blocks 103-105 to provide final command queue information. For example, many games require a button to be pressed quickly for a period of time for an action to be completed (e.g., recover a character's health or other game statistics). If an input button is not pressed quickly enough, the player usually loses.

At the first level, the master's input complements the slave's input in order to provide more button pushes to the game within the time slice. At the second level, the game ignores some of the master's input so as to rely more on the slave's input. At the third level, the master's input may be ignored.

According to at least one example embodiment, hold buttons or steady inputs may be adjusted according to the at least three levels described above. These at least three levels may be integrated into the method 100 at blocks 103-105 to provide final command queue information. For example, many games require one or more buttons to be held for a period of time for an action to be completed (e.g., special attack or to overcome an obstacle). If the buttons aren't held consistently the player may have to start the button hold over.

At the first level, the master's input complements the slave's input in order to provide a consistent button hold. At the second level, the master's input is ignored if the slave releases the button hold too many times. 'Too many times' is determined according to the slave's current skill level. At the third level, the master's input is ignored.

It is noted that in some implementations or scenarios, conflicting buttons may be depressed or requests may be issues for conflicting actions to be performed (e.g., jump or attack). At the first level of the at least three levels described above, the master's input wins and the slave's input is ignored if both inputs come within the same time slice. At the second level, the best input is used according to the skill level of the slave if both inputs come within the same time slice. For an example of the 'best input,' the slave's input is ignored whenever the slave's skill is low and the game determines the master is making a better choice. However, the master's input is ignored whenever the slave's skill is high and the game determines that the master is making a worse or equivalent choice. Basically, the methodology appropriates the best input that will help the slave enjoy playing the game while at the same time providing reasonable challenges.

As described herein, methodologies in accordance with example embodiments of the present invention provide valuable features for novice gamers. Furthermore, example embodiments provide new and interesting cooperative/assisted styles of game play to suite the needs of experienced gamers.

Figure 2:
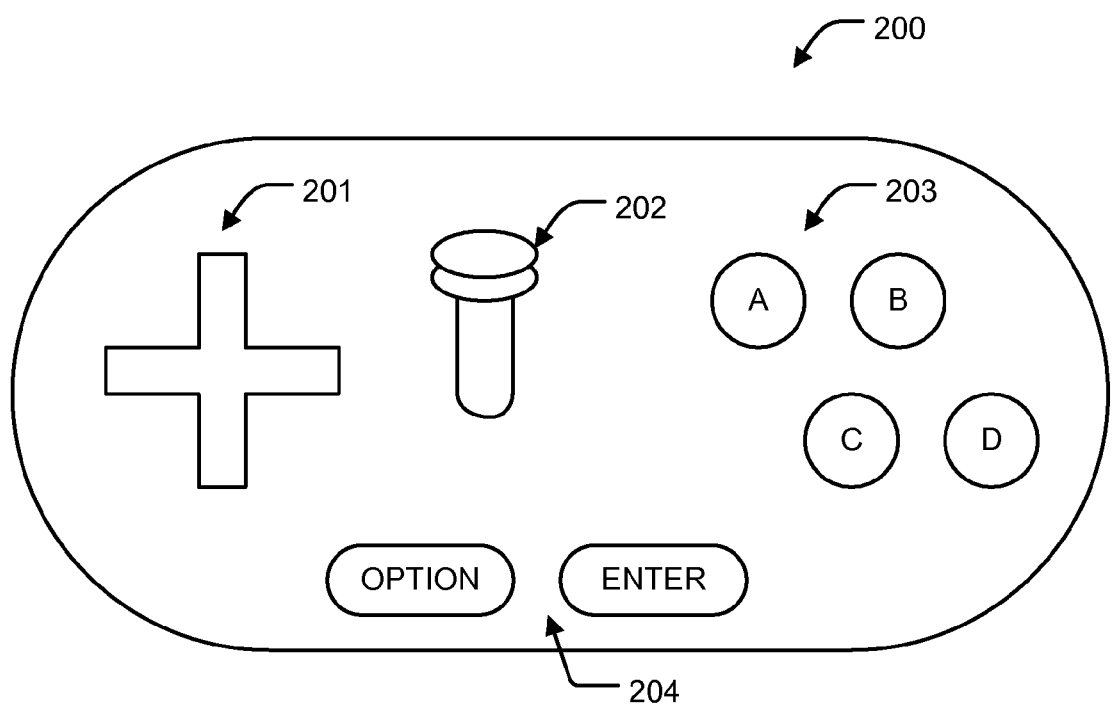
FIG. 2 illustrates a computer gaming input apparatus, according to an example embodiment.

Furthermore, according to an exemplary embodiment, the methodologies described hereinbefore may be implemented by a computer system or computer gaming apparatus including computer gaming input apparatuses. Therefore, portions or the entirety of the methodologies described herein may be executed as instructions in a processor of the computer or computer gaming system. The computer system includes memory for storage of instructions and information, input device(s) (e.g., see FIGS. 2-3) for computer communication, and a display device.

Figure 3:
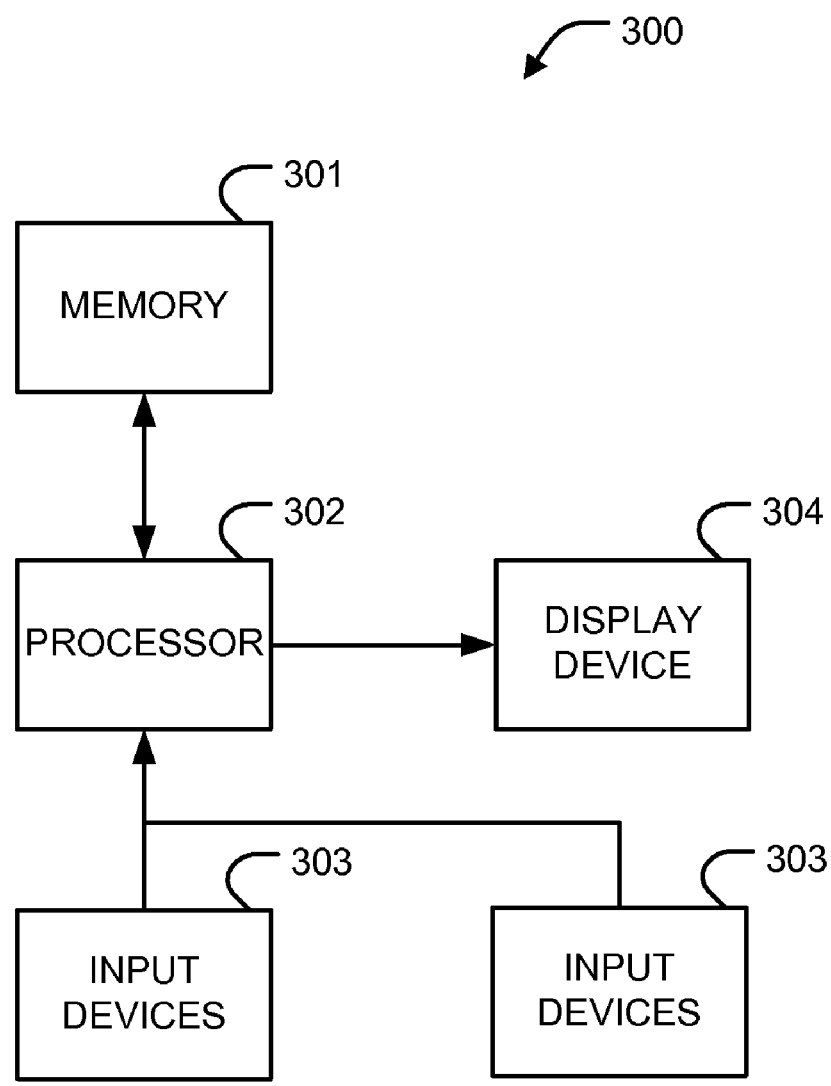
FIG. 3 illustrates a computer gaming apparatus, according to an example embodiment.

For example, the apparatus 200 may provide the ability for a user/gamer to pass input commands in a gaming style to the computer apparatus of FIG. 3. The apparatus 200 may include directional controls 201-202. These directional controls may be used in accordance to the assistance mode described above with reference to method 100 of FIG. 1. The apparatus 200 may further include button inputs 203-204. These button inputs may be used in accordance with the hold/fast button inputs and other input styles, for example, as described with reference to method 100 of FIG. 1. It is noted that the apparatus 200 is in no way limiting of example embodiments as any style of input apparatus may be used according to any particular implementation. For example, a keyboard, modified keyboard, flight joystick, or any other suitable apparatus may be used without departing from the scope of example embodiments.

Moreover, the present invention may be implemented, in software, for example, as any suitable computer program on a computer system somewhat similar to the computer systems described above. For example, a program in accordance with the present invention may be a computer program product causing a computer to execute the example methods described herein.

The computer program product may include a computer-readable medium having computer program logic or code portions embodied thereon for enabling a processor (e.g., 302) of a computer apparatus (e.g., 300) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With an exemplary embodiment of the present invention having thus been described, it will be obvious that the same may be varied in many ways. The description of the invention hereinbefore uses this example, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

The invention claimed is:

1. A method of managing multi-player game input as single-player game input for a computer gaming apparatus, the method comprising:
    building, at the computer gaming apparatus, a command queue, the command queue being a series of time-slices, each time-slice of the series of time-slices including a sequence of commands received from the multi-player game input;
    extracting a most recent time-slice from the command queue, the most recent time-slice including at least one command from a master player input of the multi-player game input and at least one command from a slave player input of the multi-player input;
    building alternate command queues with information extracted from the most recent time-slice, each alternate command queue including different input arrangements of the master player input and the slave player input;
    analyzing the command queue and the alternate command queues to determine an optimum command queue, the optimum command queue including commands from at least one input of the multi-player input, and the optimum command queue providing a sequence of commands as the single-player input; and
    outputting the optimum command queue as the single-player game input.

2. The method of claim 1, wherein the series of time-slices is organized based on an order of receipt of the sequence of commands from the multi-player game input.

3. The method of claim 1, wherein analyzing the command queue and the alternate command queues comprises:
    analyzing and/or simulating each command queue to determine simulated results; and
    choosing the command queue with the best set of results as the optimum command queue.

4. The method of claim 1, wherein building alternate command queues comprises:
    building several combinations of queues based on command patterns in the command queue, the command patterns being compared alongside at least an assistance level of master player to slave player input and an order of received commands to determine the alternate command queues.

* * * * *